US007009002B2

(12) United States Patent
Rajagopalan et al.

(10) Patent No.: US 7,009,002 B2

(45) Date of Patent: Mar. 7, 2006

(54) IMPACT RESISTANT NON-IONIC FLUOROPOLYMER BLENDS FOR GOLF BALL INNER LAYERS

(75) Inventors: Murali Rajagopalan, South Dartmouth, MA (US); Douglas S. Goguen, New Bedford, MA (US); Pamela V. Arnold, Fairhaven, MA (US)

(73) Assignee: Acushnet Company, Fairhaven, MA (US)

( * ) Notice: Subject to any disclaimer, the term of this patent is extended or adjusted under 35 U.S.C. 154(b) by 109 days.

(21) Appl. No.: 10/867,073

(22) Filed: Jun. 14, 2004

(65) Prior Publication Data

US 2004/0236018 A1 Nov. 25, 2004

Related U.S. Application Data

(63) Continuation-in-part of application No. 10/842,607, filed on May 10, 2004, which is a continuation of application No. 10/171,355, filed on Jun. 13, 2002, now Pat. No. 6,747,110.

(51) Int. Cl.

*A63B 37/06* (2006.01)
*A63B 37/12* (2006.01)
*A63B 37/00* (2006.01)

(52) U.S. Cl. ...................... 525/199; 525/200; 523/219; 473/374; 473/376

(58) Field of Classification Search ..................... None
See application file for complete search history.

(56) References Cited

U.S. PATENT DOCUMENTS

| | | | | |
|---|---|---|---|---|
| 4,085,937 | A * | 4/1978 | Schenk | 473/352 |
| 4,138,426 | A | 2/1979 | England | 260/465.6 |
| 4,452,998 | A | 6/1984 | Griffith et al. | 560/221 |
| 5,426,165 | A | 6/1995 | Kruger et al. | 526/247 |
| 5,654,373 | A | 8/1997 | Kruger et al. | 525/326.3 |
| 5,820,488 | A | 10/1998 | Sullivan et al. | 473/374 |
| 5,885,172 | A | 3/1999 | Hebert et al. | 473/354 |
| 5,962,140 | A | 10/1999 | Rajagopalan | 428/421 |
| 5,981,654 | A | 11/1999 | Rajagopalan | 525/66 |
| 5,981,673 | A | 11/1999 | DeSimone et al. | 526/89 |
| 6,132,324 | A | 10/2000 | Hebert et al. | 473/378 |
| 6,133,389 | A | 10/2000 | Anolick et al. | 526/206 |
| 6,162,135 | A | 12/2000 | Bulpett et al. | 473/373 |
| 6,177,196 | B1 | 1/2001 | Brothers et al. | 428/422 |
| 6,210,294 | B1 | 4/2001 | Wu | 473/377 |
| 6,217,464 | B1 | 4/2001 | Chang | 473/378 |
| 6,232,389 | B1 | 5/2001 | Feeney et al. | 524/450 |
| 6,232,400 | B1 | 5/2001 | Harris et al. | 525/176 |
| 6,274,669 | B1 | 8/2001 | Rajagopalan | 525/64 |
| 6,287,216 | B1 | 9/2001 | Boehm | 473/354 |
| 6,291,592 | B1 | 9/2001 | Bulpett et al. | 525/248 |
| 6,300,445 | B1 | 10/2001 | Huang et al. | 526/248 |
| 6,371,870 | B1 | 4/2002 | Calabria et al. | 473/370 |
| 6,392,002 | B1 | 5/2002 | Wu | 528/76 |
| 2003/0236353 | A1 * | 12/2003 | Rajagopalan | 525/199 |

* cited by examiner

*Primary Examiner*—David J. Buttner
(74) *Attorney, Agent, or Firm*—William B. Lacy

(57) ABSTRACT

A golf ball comprising a core having a first density formed from a diene rubber composition including glass microspheres having an isotactic crush strength of about 5,000 psi or greater and having a true density of about 0.70 g/cm$^3$ or less, the microspheres being present in an amount sufficient to lower the first density to about 1.05 g/cm$^3$ or less; a cover; and an intermediate layer disposed between the core and the cover, the intermediate layer having a density of from about 1.3 g/cm$^3$ to about 1.9 g/cm$^3$ and including a composition formed from a compatibilized blend of a non-ionic fluoropolymer and an acrylate-based polymer; wherein a ratio of the core density to the intermediate layer density is between about 0.81 to about 0.5.

25 Claims, No Drawings

IMPACT RESISTANT NON-IONIC FLUOROPOLYMER BLENDS FOR GOLF BALL INNER LAYERS

CROSS REFERENCE TO RELATED APPLICATIONS

This application is a a continuation-in-part of co-pending U.S. application Ser. No. 10/842,607, filed May 10, 2004, which is a continuation of U.S. application Ser. No. 10/171,355, filed Jun. 13, 2002, now U.S. Pat. No. 6,747,110.

FIELD OF THE INVENTION

This invention relates generally to golf balls, and more specifically, to the use of impact modified non-ionic fluoro-copolymers or their hydrogenated derivatives to produce golf ball inner layer compositions.

BACKGROUND OF THE INVENTION

Solid core golf balls are well known in the art. Typically, the core is made from polybutadiene rubber material that provides the primary source of resiliency for the golf ball. A known drawback of polybutadiene cores cross-linked with peroxide and/or zinc diacrylate is the adverse effect of the absorption of water vapor, which can degrade the performance of the core material, in particular resilience.

Prolonged exposure to water vapor (i.e., at high humidity) and elevated temperature may be sufficient to allow the water vapor to invade polybutadiene cores, reducing the initial velocity of the golf ball by about 1.8–4.0 ft/s, sometimes greater. The change in compression may be reduced by 5% or more. Absorbed water vapor can also reduce golf ball coefficient of restitution ("COR"). When a golf ball is subjected to prolonged storage and/or use under humid conditions (i.e., 25–35% relative humidity), or conditions exhibiting a combination of high temperature and humidity, the COR of the golf ball decreases over time due to water vapor absorption.

Therefore, cores of this nature must be covered quickly to maintain optimum ball properties. A cover that protects the core from the elements and repeated impacts from golf clubs is typically made from ionomer resins, balata, or urethane, among other materials. Ionomer covers, particularly hard ionomers, offer some protection against the absorption of water vapor. However, it is more difficult to control or impart spin to balls with these types of covers. Urethane covers can provide better ball control but offer less resistance to water vapor than do ionomer covers. Several prior patents have addressed the water vapor absorption problem. These include U.S. Pat. Nos. 5,820,488; 5,885,172; 6,132,324; 6,232,389; and 6,287,216, which are incorporated by reference herein, in their entirety. Manufacturers have typically resorted to the incorporation of a WVB material in an existing layer or a designated WVB layer to overcome the water vapor absorption problem in golf balls, escalating manufacturing cost and construction complexity. It is therefore desirable to provide cost-effective material compositions that have general characteristics suitable for golf ball constructions with concomitant WVB properties.

One particular class of polymers suitable for golf ball compositions of the present invention is fluoropolymers.

Fluoropolymers are well known for their excellent resistance to outdoor weathering and ultraviolet radiation, high degree of physical toughness, chemical inertness, water and gas impermeability, low moisture absorption, good abrasion resistance, non-tackiness, resistance to soiling, as well as a significant retention of these properties at both low and elevated temperatures. This rare combination of properties is due to the strength of the C—F bond. Other desirable properties of the fluoropolymers include high elongation, low coefficient of friction, low wear rate, good resistance to swell in solvents, low refractive index, and low dielectric constant. These desirable properties allow the fluoropolymers to be widely used as self-supporting layers or outer coatings on various substrates. Disclosures of fluoropolymer applications in golf ball compositions, however, are relatively limited. These include U.S. Pat. Nos. 5,962,140; 6,133,389; and 6,217,464, which are incorporated by reference herein, in their entirety.

On their own, fluoropolymers as inner golf ball layers generally have poor impact durability. Attempts to impact modify fluoropolymers by blending with functionalized polymers, such as grafted polyolefins, grafted block SEBS polymers (i.e., Kraton®), low modulus ionomers (i.e., VLMI), and highly-neutralized polymers, have been largely unsuccessful. There remains a need, therefore, for fluoropolymers modified to improve impact resistance of golf ball inner layers formed form such materials.

It has been determined, however, that the use of alkyl acrylate based block copolymers, such as methyl-methacrylate-styrene-butadiene ("MMA-SBS"), or hydrogenated derivatives thereof, impact modify non-ionic fluoro-copolymers ("IM-NIFP") in a manner such that the impact resistance of golf ball layers formed of these materials is greatly improved. It has also been determined that the materials the present invention provide added benefits, above and beyond the impact modification including, but not limited to, improved moisture barrier properties, high specific gravity, and increased flexibility with respect to tailoring material properties (by varying the ratio of fluoropolymer to alkyl acrylate block copolymers and/or varying the block components themselves (i.e., low to high methyl methacrylate levels)).

SUMMARY OF THE INVENTION

The present invention is directed to a golf ball comprising a core having a first density formed from a diene rubber composition comprising glass microspheres having an isotactic crush strength of about 5,000 psi or greater and having a true density of about 0.70 $g/cm^3$ or less, the microspheres being present in an amount sufficient to lower the first density to about 1.05 $g/cm^3$ or less; a cover; and an intermediate layer disposed between the core and the cover, the intermediate layer having a density of from about 1.3 $g/cm^3$ to about 1.9 $g/cm^3$ and comprising a composition formed from a compatibilized blend of a non-ionic fluoropolymer and an acrylate-based polymer; wherein a ratio of the core density to the intermediate layer density is between about 0.81 to about 0.5.

The acrylate-based polymer or non-ionic fluoropolymer may include a homopolymer, a copolymer, or a terpolymer. The acrylate-based polymer preferably includes a homopolymer having the structure:

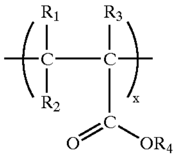

where x is a repeat unit from 100 to 100,000; $R_1$, $R_2$, and $R_3$ are H, aryl, or alkyl moieties having the formula $C_nH_{2n+1}$, where n=1 to 6; and $R_4$ is an alkyl moiety having the formula $C_nH_{2n+1}$; a copolymer having the structure:

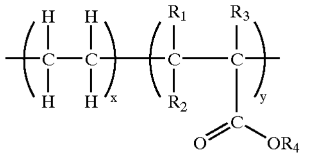

where x=99 to 1 weight %; y=1 to 99 weight %; and $R_1$, $R_2$, and $R_3$ are H, aryl, or alkyl moieties having the formula $C_nH_{2n+1}$, where n=1 to 6, and $R_4$ is an alkyl moiety having the formula $C_nH_{2n+1}$; or a terpolymer having the structure:

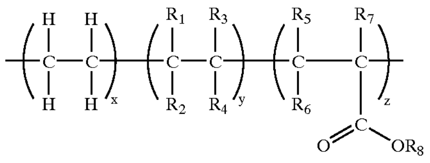

where x=98 to 1 weight %; y=1 to 98 weight %; z=1 to 10 weight %; and $R_1$, $R_2$, $R_3$, $R_4$, $R_5$, $R_6$, and $R_7$, are H, aryl, or alkyl moieties having the formula $C_nH_{2n+1}$, where n=1 to 6, and $R_8$ is an alkyl moiety having the formula $C_nH_{2n+1}$.

In one embodiment, the non-ionic fluoropolymer has a formula:

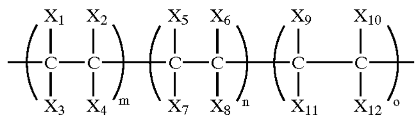

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the non-ionic fluoropolymer; n ranges from 0 to 50 percent by weight of the non-ionic fluoropolymer; and o ranges from 0 to 35 percent by weight of the non-ionic fluoropolymer.

In a preferred embodiment, the intermediate layer comprises an outer core layer, a casing layer, a mantle layer, or an inner cover layer. The intermediate layer may also include a thermoplastic material comprising polyesterester block copolymers, polyetherester block copolymers, polyetheramide block copolymers, partially or filly neutralized ionomer resins, dynamically vulcanized thermoplastic elastomers, hydrogenated styrene-butadiene elastomers with functional groups attached, thermoplastic polyurethanes, thermoplastic polyesters, metallocene polymers; styrene-propylene-diene rubbers; polybutadienes; chloroprene rubbers; acrylonitrile rubbers; acrylonitrile-butadiene rubbers; ethylene/propylene/diene terpolymers; polypropylene resins; epoxy; polyurea; styrene-ethylene block copolymers; maleic anhydride or succinate modified metallocene catalyzed ethylene copolymers; chlorinated polyethylenes; polysulfide rubbers; fluorocarbons; or polymethylmethacrylate.

Preferably, the non-ionic fluoropolymer has a material hardness between about 25 Shore D and about 75 Shore D, more preferably between about 50 Shore D and about 70 Shore D. The intermediate or cover layer typically has a thickness between about 0.005 inches and about 0.085 inches, more preferably between about 0.030 inches and about 0.060 inches. The golf ball should have an outer diameter between about 1.50 inches and about 1.65 inches.

In one embodiment, the core includes a center, the center being solid, hollow, liquid-filled, gel-filled, or gas-filled, and at least one outer core layer. The cover can be formed of a castable or non-castable thermoplastic or thermosetting material comprising partially- or fully-neutralized ionomer resins; epoxy; polyurethanes comprising polyols and polyisocyanates; balata; vinyl resins; polyolefins; polyureas; polyamides; acrylic resins and blends thereof; block copolymers; copoly(ether-amide); polyphenylene oxide resins and blends thereof; thermoplastic polyesters; blends and alloys including polycarbonate with acrylonitrile butadiene styrene and polyvinyl chloride with acrylonitrile butadiene styrene; or blends of thermoplastic rubbers with polyethylene and propylene. The core has a Shore D hardness of less than about 60.

The core or cover may also include at least one additive comprising antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; or a mixture thereof. Ideally, the core density is about 0.95 or less.

A golf ball comprising a core comprising a center and an outer core layer, at least one of the center or core layer comprising glass microspheres having a true density of about 0.7 $g/cm^3$ or less and a thermal conductivity of about 0.125 $W \cdot m^{-1} \cdot K^{-1}$ or greater when measured at 70° F., such that the core has a density of about 1.05 $g/cm^3$ or less; an inner cover layer and an outer cover layer comprising a castable or non-castable thermoplastic or thermosetting material comprising partially- or fully-neutralized ionomer resins; epoxy; polyurethanes comprising polyols and polyisocyanates; balata; vinyl resins; polyolefins; polyureas; polyamides; acrylic resins and blends thereof; block copolymers; copoly(ether-amide); polyphenylene oxide resins and blends thereof; thermoplastic polyesters; blends and alloys including polycarbonate with acrylonitrile butadiene styrene and polyvinyl chloride with acrylonitrile butadiene styrene; or blends of thermoplastic rubbers with polyethylene and propylene; and an intermediate layer disposed between the core and the inner cover layer, the intermediate layer comprising a composition formed from a compatibilized blend of a non-ionic fluoropolymer and an acrylate-based polymer.

In another embodiment, the intermediate layer has a density of from about 1.3 g/$cm^3$ to about 1.9 g/$cm^3$. A ratio of the core density to the intermediate layer density should be between about 0.81 to about 0.5. Preferably, the acrylate-based polymer includes a homopolymer having the structure:

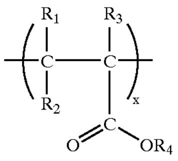

where x is a repeat unit from 100 to 100,000; $R_1$, $R_2$, and $R_3$ are H, aryl, or alkyl moieties having the formula $C_nH_{2n+1}$, where n=1 to 6; and $R_4$ is an alkyl moiety having the formula $C_nH_{2n+1}$; a copolymer having the structure:

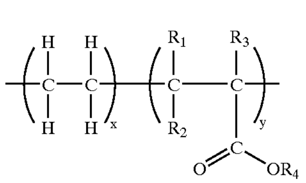

where x=99 to 1 weight %; y=1 to 99 weight %; and $R_1$, $R_2$, and $R_3$ are H, aryl, or alkyl moieties having the formula $C_nH_{2n+1}$, where n=1 to 6, and $R_4$ is an alkyl moiety having the formula $C_nH_{2n+1}$; or a terpolymer having the structure:

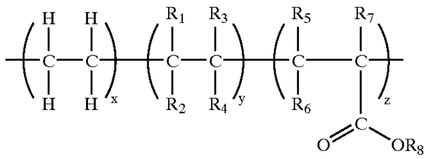

where x=98 to 1 weight %; y=1 to 98 weight %; z=1 to 10 weight %; and $R_1$, $R_2$, $R_3$, $R_4$, $R_5$, $R_6$, and $R_7$, are H, aryl, or alkyl moieties having the formula $C_nH_{2n+1}$, where n=1 to 6, and $R_8$ is an alkyl moiety having the formula $C_nH_{2n+1}$.

The golf ball should have an outer diameter between about 1.50 inches and about 1.65 inches. The intermediate or cover layer preferably has a thickness between about 0.005 inches and about 0.085 inches. The non-ionic fluoropolymer has a formula:

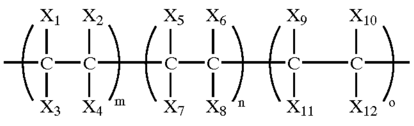

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the non-ionic fluoropolymer; n ranges from 0 to 50 percent by weight of the non-ionic fluoropolymer; and o ranges from 0 to 35 percent by weight of the non-ionic fluoropolymer.

Preferably, at least one of the center or outer core layer comprises glass microspheres in an amount sufficient to decrease the core density to 0.95 or less and/or at least one of the center or outer core layer is formed from a diene rubber composition, or partially- or fully-neutralized ionomers.

DEFINITIONS

The following terms that are used in this application are defined in terms of the enumerated ASTM tests: Specific Gravity ASTM D-792 (temperature was controlled to 20–23° C.); Flexural Modulus ASTM D-790 and ASTM D6272-02 (50% R.H., 23° C., not less than 40 hr); Shore D Hardness ASTM D-2240; Coefficient of Friction ASTM D 1894 at 73° F.; and Shore C Hardness ASTM D-2240.

As used herein, the terms "points" and "compression points" refer to the compression scale or the compression scale based on the ATTI Engineering Compression Tester. This scale, which is well known to those working in this field, is used in determining the relative compression of a core or ball.

As used herein, "COR" refers to Coefficient of Restitution, which is obtained by dividing a ball's rebound velocity by its initial (i.e., incoming) velocity. This test is performed by firing the samples out of an air cannon at a vertical steel plate over a range of test velocities (from 75 to 150 ft/s). A golf ball having a high COR dissipates a smaller fraction of its total energy when colliding with the plate and rebounding therefrom than does a ball with a lower COR. Unless otherwise noted, the COR values reported herein are the values determined at an incoming velocity of 125 ft/s.

As used herein, the terms "fluoropolymer" and "fluorinated polymer" is defined as any themoplastic and/or elastomeric homopolymer, copolymer, terpolymer, or mixture thereof, having at least one fluorine in at least one of the monomer repeat units in the polymer.

As used herein, the terms "fluoromonomer" and "fluorinated monomer" refer to compounds containing an ethylinic group that may be free-radically polymerized and that contain at least one fluorine atom, fluoroalkyl group, or fluoroalkoxy group attached to the ethylinic group that undergoes polymerization.

As used herein, the term "copolymer" refers to a polymer which is formed from two or more monomers, wherein the monomers are not identical.

As used herein, the term "terpolymer" refers to a polymer which is formed from three monomers, wherein the monomers are not identical.

As used herein, the term "fillers" includes any compound or composition that can be used to vary the density and other properties of the subject golf ball cores.

As used herein, the term "pph" in connection with a batch formulation refers parts by weight of the constituent per hundred parts of the base composition (e.g., elastomer).

The term "about," as used herein in connection with one or more numbers or numerical ranges, should be understood to refer to all such numbers, including all numbers in a range.

DETAILED DESCRIPTION OF THE INVENTION

The golf balls of the present invention generally comprise at least one impact-modified non-ionic fluoropolymer and may comprise any of a variety of constructions, such as a two-piece, three-piece, multi-layer, or wound ball having a variety of cores, intermediate layers, covers, and coatings. The covers and cores of the present invention include structures comprising one or more layers. Cores may include a single, unitary layer, comprising the entire core from the center of the core to its outer periphery, or may contain a center surrounded by at least one outer core layer. The center, the innermost portion of the core, is preferably solid, but may be hollow or liquid-, gel-, or gas-filled. The outer core layer may also be a wound layer formed of a tensioned elastomeric material. Cover layers of the present invention may also contain one or more layers, such as a double cover comprising an inner and outer cover layer. Optionally, an intermediate layer disposed between the core and cover may be incorporated. The intermediate layer, if present, may comprise one or more layers, and are sometimes referred to in the art, and, thus, herein as well, as inner cover layers, outer core layers, or mantle layers.

Any of the core, cover, or the intermediate layer components may be formed of or include an impact-modified NIFP, but preferably, at least one of the outer core layer, intermediate layer, inner cover layer, or outer cover layer comprises a IM-NIFP.

The NIFP itself may be a homopolymer, a copolymer, a terpolymer, or a mixture thereof that comprises at least one non-ionomeric fluoromonomer. Preferably, the NIFP of the present invention has a formula:

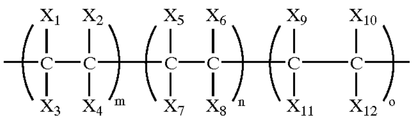

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the NIFP; n ranges from 0 to 50 percent by weight of the NIFP; and o ranges from 0 to 35 percent by weight of the NIFP.

Non-ionomeric fluoromonomers of the present invention typically are partially fluorinated and perfluorinated ethylenic monomers. Examples of such fluoromonomers include, but are not limited to, partially fluorinated and perfluorinated olefins of from about 1 to about 12 carbon atoms such as vinylidene fluoride ("VDF"); vinyl fluoride ("VF"), hexafluoropropylene ("HFP"); pentafluoropropylene ("PFP"); tetrafluoropropylene; trifluoropropylene ("TFP"); difluoropropylene; tetrafluoroethylene ("TFE"); trifluoroethylene; 1,2-difluoroethylene; chlorotrifluoroethylene ("CTFE"); 1,2-dichlorodifluoroethylene; 1-chloro-1-fluoroethylene; perfluorobutyl ethylene ("PFBE"); fluorinated alkyl α-olefins such as 3,3,3,4,4-pentafluoro-1-butene; 3,3,3-trifluoropropene; 1-hydropentafluoropropene; 2-hydropentafluoropropene; 2-trifluoromethyl-3,3,3-trifluoro-1-propene; fluorinated vinyl ethers of from about 1 to about 8 carbon atoms such as perfluoro(methylvinylether) ("PMVE"); perfluoro(ethylvinylether) ("PEVE"); perfluoro (propylvinylether) ("PPVE"); perfluorodioxoles of from about 1 to about 10 carbon atoms such as perfluoro(1,3-dioxole) and perfluoro(2,2-dimethyl-1,3-dioxole) ("PDD"); partially fluorinated and perfluorinated dienes of from about 1 to about 8 carbon atoms such as fluorinated derivatives of 1,4-butadiene and cis-isoprene; perfluoralkoxy ("PFA"); fluorosilicons; perfluorocyclics; fluorinated acrylics such as 1,1-dihydropentadecafluorooctylacrylate and 1,1-dihydropentadienefluorooctylacrylate; and mixtures thereof. Other suitable fluoromonomers for the invention are described in U.S. Pat. Nos. 6,177,196; 5,981,673; 5,654,373; 5,426,165; 4,138,426; and 4,452,998, the disclosures of which are incorporated herein by reference in their entirety.

The non-ionic fluoromonomers enlisted above may be polymerized alone to form a NIFP homopolymer if the fluoromonomer can be homopolymerized. Alternatively, the non-ionic fluoromonomer may be polymerized with one or more other fluoromonomers or other fluorine-free monomers to form a copolymer, or terpolymer. Suitable fluorine-free monomers include without limitation substituted and unsubstituted olefins of from about 1 to about 12 carbon atoms such as ethylene and propylene and isobutylene; vinyl esters of from about 1 to about 12 carbon atoms such as vinyl acetate and vinylpropionate; dienes of from about 1 to about 8 carbon atoms such as 1,4-butadiene and cis-isoprene; and mixtures thereof. A preferred NIFP homopolymer for the invention is polyvinylidene fluoride ("PVDF"), a preferred NIFP copolymer is VDF-HFP copolymer, and a preferred NIFP terpolymer is VDF-HFP-TFE terpolymer.

The NIFP's of this invention may include any cure site monomers and their halogenated derivatives commonly used in fluoropolymers, including but not limited to the non-ionic fluoromonomers listed above and derivatives thereof, as well as brominated and iodinated olefins such as 4-bromotetrafluorobutene-1, bromotrifluoroethylene, 4-iodotetrafluorobutene-1, and iodotrifluoroethylene.

The NIFP of the present invention are preferably impact modified. It is believed that the use of alkyl acrylate-based block copolymers, such as methyl-methacrylate-styrene-butadiene ("MMA-SBS"), or hydrogenated derivatives thereof, impact modify non-ionic fluoro-copolymers in a manner such that the impact resistance of golf ball layers formed of these materials is greatly improved. The NIFP can be impact modified by any alkyl acrylate-based copolymers, but are preferably impact modified by those including, but not limited to, homopolymers having the structure:

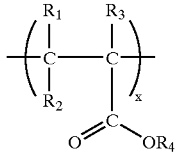

where x is a repeat unit from 100 to 100,000; $R_1$, $R_2$, and $R_3$ are H, aryl, or alkyl moieties (i.e., methyl, ethyl, propyl, butyl, pentyl, and hexyl) having the formula $C_nH_{2n+1}$, where n=1 to 6; and $R_4$ is an alkyl moiety having the formula $C_nH_{2n+1}$;

copolymers having the structure:

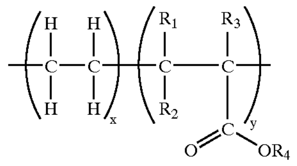

where x=99 to 1 weight %; y=1 to 99 weight %; and $R_1$, $R_2$, and $R_3$ are H, aryl, or alkyl moieties (i.e., methyl, ethyl, propyl, butyl, pentyl, and hexyl) having the formula $C_nH_{2n+1}$, where n=1 to 6, and $R_4$ is an alkyl moiety having the formula $C_nH_{2n+1}$;

and terpolymers having the structure:

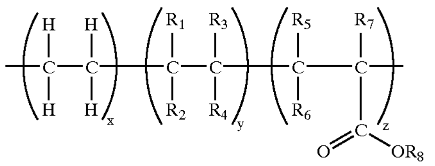

where x=98 to 1 weight %; y=1 to 98 weight %; z=1 to 10 weight %; and $R_1$, $R_2$, $R_3$, $R_4$, $R_5$, $R_6$, and $R_7$, are H, aryl, or alkyl moieties (i.e., methyl, ethyl, propyl, butyl, pentyl, and hexyl) having the formula $C_nH_{2n+1}$, where n=1 to 6, and $R_8$ is an alkyl moiety having the formula $C_nH_{2n+1}$.

Examples include, but are not limited to, poly(methyl acrylate); poly(methyl methacrylate); poly(ethyl acrylate); ethylene-methyl acrylate copolymer; and ethylene-ethyl acrylate copolymer. The impact modifying polymer may also be an acrylate-based block copolymers. Examples include, but are not limited to, block methyl methacrylate, block methyl methacrylate-styrene-butylene, and block methyl methacrylate-styrene butadiene. Representative structures are below:

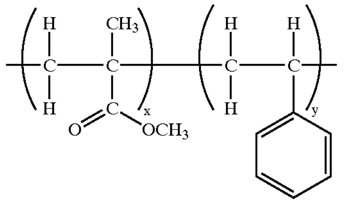

methyl methacrylate-styrene block copolymer

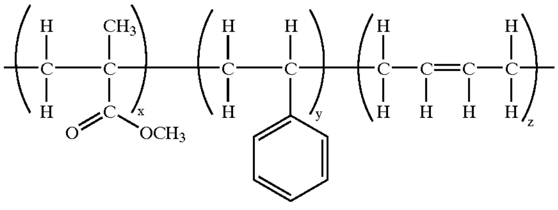

methyl methacrylate-styrene-butadiene block copolymer

-continued

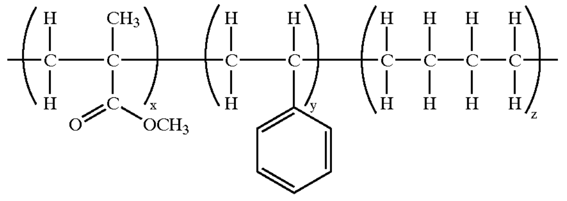

methyl methacrylate-styrene-butylene block copolymer

The NIFP's are typically compatibilized with the desired alkyl acrylate-based copolymers (block or otherwise) to form a composition suitable for golf ball intermediate layers (core or cover).

The IM-NIFP may further be blended with ionomeric fluoropolymers of U.S. Pat. Nos. 6,300,445 and 5,962,140, the disclosures of which are incorporated herein by reference in their entirety. Other additives may also be added to the IM-NIFP to enhance processability or various physical properties, such as tensile strength, flexural modulus, or water resistance. As known to one of ordinary skill in the art, such additives include without limitation chain transfer agents, peroxide curatives, amine curatives, bisphenol curatives, cross-linking agents, redox initiators, co-curing agents, dispersion fillers, density-modifying fillers, foaming agents, antioxidants, reinforcing agents, plasticizers, lubricants, processing aids, pigments and dyes, and mixtures thereof.

Most of the above mentioned NIFP's are commercially available or can be prepared by methods well known in the art. For example, Atofina Chemicals, Inc. supplies VDF homopolymers under the trademark of Kynar® PVDF, VDF-HFP copolymers under the trademarks of Kynar Flex® and Kynar SuperFlex®, fluorinated acrylic copolymers under the trademark of Foraperle®, and CTFE homopolymers under the trademark of Voltalef®. E.I. Dupont de Nemours and Company produces TFE homopolymers under the trademark of Teflon® PTFE, TFE-PPVE copolymers under the trademark of Teflon® NXT, ethylene-TFE copolymer under the trademark of Tefzel® ETFE, TFE-HFP copolymers under the trademark of Teflon® FEP, fluoroelastomers such as VDF-HFP copolymers under the trademark of Viton®, PFA copolymers under the trademark of Teflon® PFA, perfluorocyclopolymers under the trademark of Teflon® AF, and perfluoroelastomers under the trademark of Kalrez®. 3M provides VDF-HFP copolymers and VDF-HFP-TFE terpolymers under the trademark of Dyneon®. Ausimont supplies VDF homopolymers under the trademark of Hylar®, VDF-HFP copolymers and VDF-HFP-TFE terpolymers under the trademark of Tecnoflon®, ethylene-CTFE copolymers under the trademark of Halar®, modified ethylene-CTFE under the trademark of Vatar®, TFE-PFA copolymers and PFA homopolymers under the trademark of Hyflong, and TFE homopolymers under the trademarks of Algoflon® and Polymist®. Daikin Industries, Ltd. produces VDF homopolymers under the trademark of Neoflon® PVDF, VDF-HFP copolymers and VDF-HFP-TFE terpolymers under the trademark of Dai-El®, TFE homopolymers under the trademark of Polyflon® PTFE, TFE-PAVE copolymers under the trademark of Neoflon® PFA, TFE-HFP copolymers under the trademark of Neoflon® FEP, and CTFE homopolymers under the trademark of Neoflon® PCTFE. Asahi Glass Company manufactures ethylene-TFE copolymers, TFE homopolymers, and PFA homopolymers under the trademark of Fluon®, FEVE alternating copolymers under the trademark of Lumiflon®, propylene-TFE alternating copolymers under the trademark of Aflas®, and amorphous perfluorocyclopolymers under the trademark of Cytop®. Other commercial NIFP's include TFE-based fluoropolymers the trademarks of Lubriflon® and Valflon® available from Dixon Resine. Preferably the NIFP's for the present invention are VDF homopolymers and VDF-HFP copolymers available from Atofina Chemicals, Inc. under the trademark of Kynar Flex®. Specific examples and their properties are listed in Table I below.

intermediate layer composition is a polyetherester block copolymer, with Hytrel® 3078 being a particularly preferred polyetherester block copolymer.

In accordance to the present invention, the NIFP homopolymers, copolymers and terpolymers described herein may be used in forming any golf ball component layers such as outer core layers and intermediate layers, as well as in covers, including inner and outer cover layers. The intermediate layers of the present invention are formed from an intermediate layer composition comprising up to 100% by weight of a NIFP. In one embodiment of the present invention, the intermediate layer is formed from a composition of about 1% to about 99% by weight of a NIFP, about 0% to about 75% by weight of a thermoplastic as describe above, and about 0% to about 50% by weight of a density-modifying filler such as zinc oxide. In another embodiment, the intermediate layer is formed from a composition of about 10% to about 75% by weight of a NIFP, about 0% to about 25% by weight of a thermoplastic, and about 5% to about 40% by weight of zinc oxide. Most preferably, the intermediate layer of the present invention comprises about 100% of a NIFP.

TABLE I

Physical and mechanical properties of Kynar Flex ® PVDF

| Properties | Series 2500 | Series 2750/2950 | Series 2800/2900 | Series 2850 | Series 3120 |
|---|---|---|---|---|---|
| Specific Gravity | 1.80–1.82 | 1.78–1.80 | 1.76–1.79 | 1.76–1.79 | 1.76–1.79 |
| Water Absorption (%) | 0.04–0.07 | 0.04–0.07 | 0.03–0.05 | 0.03–0.05 | 0.03–0.05 |
| Flexural Modulus (psi) | 28,000–36,000 | 49,000–58,000 | 90,000–120,000 | 160,000–180,000 | 90,000–120,000 |
| Hardness (Shore D) | 55–60 | 62–67 | 65–70 | 70–75 | 65–70 |

In one embodiment of the present invention, the intermediate layer is formed from a composition comprising at least one NIFP described above and a thermoplastic material. Suitable thermoplastic materials for use in the intermediate layer composition include, but are not limited to, polyesterester block copolymers, polyetherester block copolymers, polyetheramide block copolymers, partially or fully neutralized ionomer resins, dynamically vulcanized thermoplastic elastomers, hydrogenated styrene-butadiene elastomers with functional groups such as maleic anhydride or sulfonic acid attached, thermoplastic polyurethanes, thermoplastic polyesters, polymers formed using a metallocene catalyst ("metallocene polymers"); styrene-propylene-diene rubbers; polybutadienes; chloroprene rubbers; acrylonitrile rubbers; acrylonitrile-butadiene rubbers; EPDM; polypropylene resins; epoxy; polyureas; styrene-ethylene block copolymers; maleic anhydride or succinate modified metallocene catalyzed ethylene copolymers; chlorinated polyethylenes; polysulfide rubbers; fluorocarbons such as hexafluoroacetone; polymethylmethacrylate ("PMMA"), and blends thereof. Any of these materials having one or more acidic or ionic moieties may be partially or fully neutralized, preferably by at least about 40%, more preferably by at least about 70%, and most preferably by about 100%.

Suitable thermoplastic polyetheresters include Hytrel® 3078, G3548W and G4078W from E. I. du Pont de Nemours and Company. Suitable thermoplastic polyetheramides include Pebax® 2533, 1205 and 4033 from Atofina Chemicals, Inc. Suitable thermoplastic ionomer resins include any number of olefinic based ionomers such as Surlyn® and lotek®. Suitable dynamically vulcanized thermoplastic elastomers include Santoprene®, Sarlink®, Vyram®, Dytron®, and VistaFlex®. Examples of suitable functionalized hydrogenated styrene-butadiene elastomers having functional groups such as maleic anhydride or sulfonic acid, include Kraton® FG-1901x and FG-1921x from Shell Corporation. Examples of suitable thermoplastic polyurethanes include Estane® 58133, 58134 and 58144 from B.F. Goodrich Company. Suitable metallocene-catalyzed polymers include those commercially available from Sentinel Products. Suitable thermoplastic polyesters include poly(butylene terephthalate), poly(ethylene terepthalate), and poly(trimethylene terepthalate). Preferably the thermoplastic material of the It is preferred that the NIFP used in the intermediate layers of the present invention has a flexural modulus of greater than about 10,000 psi, more preferably between about 30,000 psi and about 150,000 psi and, most preferably, between about 55,000 psi and about 75,000 psi. This is particularly desirable when the intermediate layer is an inner cover layer for a golf ball with a double-cover construction. Additionally, it is preferred that the NIFP has a Shore D hardness of between about 25 and about 75 and, more preferably, between about 50 and about 70. NIFP's of this nature include Kynar Flex® Series 2750 and 2800 from Atofina Chemicals, Inc.

The intermediate layers employed in the golf balls of the present invention preferably have a thickness from about 0.005 inches to about 0.125 inches, more preferably about 0.005 inches to about 0.085 inches, and most preferably about 0.030 inches to about 0.060 inches. The outer diameter of the intermediate layers is preferably between about 1.500 inches and about 1.650 inches, more preferably between about 1.550 inches and about 1.640 inches.

The compositions of the present invention may also include fillers to adjust the density and/or specific gravity of the intermediate layer to a range of from about 0.90 to about 3.00. To increase the density of the NIFP (typically about 1.80 for Kynar Flex® PVDF), suitable fillers are generally inorganic, and include numerous metals or metal oxides and salts such as tungsten, tungsten carbide, zinc oxide, tin oxide, calcium oxide, barium sulfate, zinc sulfate, calcium carbonate, barium carbonate, zinc carbonate, as well as clay, an array of silicas, regrind (recycled core material typically ground to about 30 mesh particle), high-Mooney-viscosity rubber regrind, and mixtures thereof. Alternatively, fillers having a specific gravity less than that of the NIFP may be used to reduce the specific gravity of the intermediate layer. Such density-reducing fillers include foaming agents, blowing agents, micro balloons, cellular foams and other materials having a relatively large void volume.

Fillers may also include various polymers, ceramics, and glass microspheres that are solid or hollow, and filled or unfilled, all of which are readily selected by one of ordinary skill in the art. Typically, such fillers have a specific gravity less than 1.00, especially given the relatively increased density of the NIFP of the present invention. One glass filler suitable for the compositions of the present invention is glass microspheres, such as those manufactured by 3M™ of Minneapolis, Minn. Glass microspheres of the present invention should have an isotactic crush strength (by Method QCM 14.1.8) of about 5,000 psi or greater, preferably between about 5,000 psi and about 20,000 psi, more preferably between about 5,500 psi and about 18,000 psi, and most preferably between about 10,000 psi and about 18,000 psi. The density of the glass microspheres typically ranges from about 0.30 $g/cm^3$ to about 0.70 $g/cm^3$, preferably between about 0.38 $g/cm^3$ and about 0.63 $g/cm^3$, more preferably between about 0.41 $g/cm^3$ and about 0.63 $g/cm^3$, and most preferably between about 0.57 $g/cm^3$ and about 0.63 $g/cm^3$. Ideally, the density of the glass microspheres, when blended, should not vary by more than about 0.06 $g/cm^3$. Preferred glass microspheres have a thermal conductivity of about 0.125 $W \cdot m^{-1} \cdot K^{-1}$ and greater, more preferably between about 0.127 $W \cdot m^{-1} \cdot K^{-1}$ and about 0.2 $W \cdot m^{-1} \cdot K^{-1}$ (when measured at 70° F.). Preferably, the glass microspheres have a dielectric constant of between about 1.2 and about 2.0 at 100 MHz. Preferred particle size of the glass microspheres is between about 10 $\mu$m and about 85 $\mu$m, more preferably between about 30 $\mu$m and about 75 $\mu$m, and most preferably between about 30 $\mu$m and about 55 $\mu$m.

The preferred range of specific gravity for golf ball intermediate layers of the present invention is from about 0.90 to about 1.50, more preferably from about 1.20 to about 1.30. The specific gravity of the golf ball depends upon the size of the finished ball and the size and specific gravity of the core, the intermediate layer(s), and the cover.

The NIFP-based compositions for the intermediate layers of the present invention may be extruded as thin threads and wound about a solid core or a liquid-filled core to form a wound intermediate layer. Preferably the intermediate layer is compression or injection molded about the core. Alternatively, pre-formed intermediate layer half shells are adhered onto the core using an adhesive. For proper adhesion, the adhesives include, but are not limited to, silane coupling agents; two-part adhesive of poly(VDF-HFP) and ketenes; polytetrafluoroethylene; fluoroethylene-propylene; high molecular weight polyethylene and polypropylene; perfluoroacrylate; PVDF; VDF-HFP-TFE terpolymer; polychlorotrifluoroethylene; epichlorohydrin rubber with organic phosphonium; and mixtures thereof. The inner adhesion side of the intermediate layers may be treated to improve wettability by using any suitable conventional processes such as flame treatment, corona treatment, or chemical treatment. These processes tend to convert the surface of the NIFP intermediate layers from a relatively low energy surface to a high energy, partially oxidized surface, which in turn improves adhesion.

The golf ball cover of the present invention is preferably tough, cut-resistant, and selected from conventional materials used as golf ball covers based on the desired performance characteristics. The cover may comprise one or more layers including an outer cover layer and at least one inner cover layer. These layers may comprise thermoplastic and/or thermosetting materials include, without limitation, partially or fully neutralized ionomer resins; epoxy; polyurethanes comprising polyols and polyisocyanates; balata; vinyl resins; polyolefins; polyureas; polyamides such as poly(hexamethylene adipamide) and poly(caprolactam); acrylic resins and blends thereof; block copolymers such as styrene-butadiene rubber and isoprene- or ethylene-butylene rubber; copoly(ether-amide) such as Pebax®; polyphenylene oxide resins and blends thereof such as Noryl®; thermoplastic polyesters such as Hytrel® and Lomod®; blends and alloys including polycarbonate with acrylonitrile butadiene styrene and polyvinyl chloride with acrylonitrile butadiene styrene; blends of thermoplastic rubbers with polyethylene and propylene; and mixtures thereof. Conventional additives for the cover layer compositions include, but are not limited to, antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; and mixtures thereof. Such additives may be incorporated in any amounts that will achieve their desired purpose.

To minimize water vapor adsorption into the golf ball, it is desirable that the cover of the golf balls has water vapor barrier property. While many WVB materials disclosed in prior art may be incorporated into the cover, it is preferred that the WVB material for golf ball covers of the present invention is a NIFP as described above. A compatibilizer may be needed to blend the NIFP with the cover materials mentioned above. Examples of the compatibilizer are described in U.S. Pat. No. 6,274,669, the disclosure of which is incorporated herein by reference in its entirety. The cover may comprise a single cover layer, or an outer cover layer and at least one inner cover layer. In one embodiment of the present invention, at least one of the cover layers is formed from a composition of about 1% to about 99% by weight of a NIFP, about 10% to about 50% by weight of a thermoplastic or thermosetting material such as an partially or fully neutralized ionomer resin or a polyurethane, and about 0% to about 15% by weight of a compatibilizer. Preferably, the cover of the present invention comprises about 100% of a NIFP.

Partially or fully neutralized ionomer resins for the golf ball covers include copolymers or terpolymers of ethylene and an unsaturated monocarboxylic acid with an optional softening comonomer such as acrylate or methacrylate. The carboxylic acid groups in these ionomers include acrylic, methacrylic, crotonic, maleic, fumaric or itaconic acid partially or fully neutralized by a cation such as lithium, sodium, potassium, zinc, magnesium, calcium, barium, lead, tin, aluminum, or a combination thereof, with lithium, sodium and zinc being preferred. Specific ionomers preferably include ethylene/(meth)acrylic acid, ethylene/(meth) acrylic acid/n-butyl acrylate, ethylene/(meth)acrylic acid/ ethyl acrylate, and ethylene/(meth)acrylic acid/methyl acrylate, commercially available as Surlyn® from E. I. Dupont de Nemours and Company, and as lotek® from Exxon.

Suitable polyurethanes for golf ball covers of the present invention include those disclosed in U.S. Pat. Nos. 6,392, 002, 6,371,870 and 6,210,294, incorporated herein by reference in their entirety, and generally comprise the reaction product of at least one polyisocyanate, polyol, and at least one curing agent. Any polyisocyanate available to one of ordinary skill in the art may be used in accordance with the invention, preferably including, but is not limited to, 4,4'-diphenylmethane diisocyanate ("MDI"); polymeric MDI;

carbodiimide-modified liquid MDI; 4,4'-dicyclohexylmethane diisocyanate ("$H_{12}$MDI"); p-phenylene diisocyanate ("PPDI"); m-phenylene diisocyanate ("MPDI"); toluene diisocyanate ("TDI"); or a mixture thereof. It is well understood in the art that the hardness of polyurethane is correlated to the percent of unreacted NCO groups in the polyisocyanate. Preferably, the at least one polyisocyanate has less than about 14% unreacted NCO groups, more preferably less than about 7.5%, and more preferably less than about 7.0%.

Any polyol available to one of ordinary skill in the art is suitable for use according to the invention, having saturated or unsaturated bonds, or substituted or unsubstituted aromatic and cyclic groups in the hydrocarbon chain. Exemplary polyols include, but are not limited to, polyether polyols, polyester polyols, polycaprolactone polyols, and polycarbonate polyols. Suitable polyether polyols include, but are not limited to, polytetramethylene ether glycol ("PTMEG"), polyethylene propylene glycol, polyoxypropylene glycol, and mixtures thereof. Suitable polyester polyols include, but are not limited to, polyethylene adipate glycol; polybutylene adipate glycol; polyethylene propylene adipate glycol; o-phthalate-1,6-hexanediol; poly(hexamethylene adipate) glycol; and mixtures thereof. Suitable polycaprolactone polyols include, but are not limited to, 1,6-hexanediol-initiated polycaprolactone, diethylene glycol initiated polycaprolactone, trimethylol propane initiated polycaprolactone, neopentyl glycol initiated polycaprolactone, 1,4-butanediol-initiated polycaprolactone, PTMEG-initiated polycaprolactone, and mixtures thereof. Suitable polycarbonates include, but are not limited to, polyphthalate carbonate and poly(hexamethylene carbonate) glycol. Preferably, the polyol of the present invention includes PTMEG.

The curing agent may be an amine, a hydroxyl-terminated curative, or a mixture thereof. Suitable amine curing agents are primary or secondary amines include, but are not limited to, 4,4'-bis-(sec-butylamino)-dicyclohexylmethane; 1,4-bis-(sec-butylamino)-cyclohexane; 3,5-dimehtylthio-2,4(2,6)-toluenediamine; 3,5-diethyl-2,4(2,6)-toluenediamine; N,N'-dialkyldiamine diphenyl methane; 4,4'-diamino-3,3'-diethyl-5,5'-dimethyl diphenylmethane; 2,2', 3,3'-tetrachloro diamino diphenylmethane; trimethylene-glycol-di-p-aminobenzoate; polytetramethyleneoxide-di-p-aminobenzoate; 4,4'-methylene-bis-(2-chloroaniline); 4,4'-methylene-bis-(3-chloro-2,6-diethylaniline) ("MCDEA"); p,p'-methylene dianiline ("MDA"); m-phenylenediamine ("MPDA"); 4,4'-methylene-bis-(2-chloroaniline) ("MOCA"); 4,4'-methylene-bis-(2,6-diethylaniline) ("MDEA"); 4,4'-methylene-bis-(2,3-dichloroaniline) ("MDCA"); isomers thereof and mixtures thereof. Suitable hydroxyl-terminated curatives are diols, triols, and tetraols that include, but are not limited to, ethylene glycol; diethylene glycol; polyethylene glycol; propylene glycol; polypropylene glycol; polytetramethylene ether glycol; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,3-propane glycol; 1,4-butanediol; 1, 5-pentanediol 1,6-hexanediol; resorcinol-di-(β-hydroxyethyl) ether; hydroquinone-di-(β-hydroxyethyl) ether; and mixtures thereof. Both amine and hydroxyl-terminated curatives can include one or more saturated, unsaturated, halogen, aromatic, cyclic groups. Preferably, the curing agent for the polyurethane cover compositions includes 4,4'-bis-(sec-butylamino)-dicyclohexylmethane (Clearlink® 1000); 1,4-bis-(sec-butylamino)-cyclohexane (Clearlink® 3000); 3,5-dimehtylthio-2,4(2,6)-toluenediamine (Ethacure® 300); 3,5-diethyl-2,4(2,6)-toluenediamine; 1,3-bis(2-hydroxyethoxy) benzene; 1,3-bis-[2-(2-hydroxyethoxy) ethoxy] benzene; 1,3-bis-{2-[2-(2-hydroxyethoxy) ethoxy] ethoxy} benzene; 1,4-butanediol, and mixtures thereof.

In a particularly preferred embodiment of the present invention, saturated ("aliphatic") polyurethanes are used to form cover layers, preferably the outer cover layer. The thermoset polyurethanes may be castable, reaction injection moldable, sprayable, or applied in a laminate form or by any technical known in the art. The thermoplastic polyurethanes may be processed using any number of compression or injection techniques. The cover layers preferably have a Shore D hardness of less than about 72, preferably about 40 to about 72, more preferably about 50 to about 70 and most preferably about 55 to about 65.

It is understood to one of ordinary skill in the art that the NIFP-based compositions described above for forming intermediate layers in golf ball may also be used, in part or in full, to form any of the cover layers in accordance with the present invention. Furthermore, golf ball coating layers may also comprise one or more of the NIFP's disclosed herein.

The multi-layer golf ball of the invention may have an overall diameter of any size. Although the USGA specifications limit the minimum size of a competition golf ball to 1.680 inches in diameter or more, there is no specification as to the maximum diameter. Moreover, golf balls of any size can be used for recreational play. The preferred diameter of the present golf balls is from about 1.680 inches to about 1.800 inches. The more preferred diameter is from about 1.680 inches to about 1.760 inches. The most preferred diameter is about 1.680 inches to about 1.740 inches. In another alternative embodiment, the golf balls of the present invention have an overall maximum compression of about 90, preferably about 75 to about 85, more preferably about 80 to about 85 and most preferably about 82.

A representative solid core composition in accordance with the present invention comprises an elastomeric polymer ("base rubber"), a crosslinking agent, and a free radical initiator. The base rubber typically includes natural or synthetic elastomers such as natural rubbers; balata; gutta-percha; synthetic polyisoprenes; styrene-butadiene rubbers; styrene-propylene-diene rubbers; chloroprene rubbers; acrylonitrile rubbers; acrylonitrile-butadiene rubbers; ethylene-propylene-diene terpolymers ("EPDM"); metallocene rubbers, and mixtures thereof. The elastomeric composition may also comprise polypropylene resins; partially or fully neutralized ionomer resins; polyamides; polyesters; urethanes; polyureas; thermosetting or thermoplastic elastomers such as Pebax® (Atofina), Hytrel® (Dupont) and Kraton® (Shell Chemical); styrene-ethylene block copolymers; maleic anhydride or succinate modified metallocene catalyzed ethylene copolymers; chlorinated polyethylenes; polysulfide rubbers; fluorocarbons; and mixtures thereof.

Preferably, the base rubber comprises at least about 40 pph by weight of at least one polybutadiene synthesized with cobalt, nickel, neodymium, and/or lithium catalysts. The polybutadiene preferably has a cis-1,4 content of at least about 90%, more preferably at least about 95%. Also preferably, the polybutadiene has a Mooney viscosity of at least about 30, a molecular weight of at least about 150,000 and a polydispersity of less than about 4.0. The base rubber may comprise a blend of two or more polybutadiene rubbers having different weight percentages, catalysts, molecular weights, Mooney viscosity, polydispersity, filler contents, crosslinking agent contents, or cis- and trans-isomer contents.

The cross-linking agent may be formed from salts of α,β-ethylenically unsaturated carboxylic acids having about 3 to about 8 carbon atoms, such as methacrylic, acrylic, cinnamic, crotonic, formanic and maleic acids. Other cross-linking agents include unsaturated vinyl compounds. More preferably, the cross-linking agent is a mono-(meth)acrylic acid or di-(meth)acrylic acid metal salt, wherein the cation is zinc, sodium, magnesium, or mixtures thereof. Even more preferably, the cross-linking agent is zinc diacrylate ("ZDA"), zinc dimethacrylate ("ZDMA"), or mixtures thereof. Of the common acrylate cross-linkers, ZDA has generally been found to produce golf balls with greater initial velocity than ZDMA, therefore, the former is most preferred. The crosslinking agent may be present in an amount from about 0 to about 70 pph of the base rubber. Base rubbers having little or no ZDA has low water vapor transmission rates. They are less prone to moisture absorption and related deterioration in playability and performance because of the low permeability. On the other hand, high levels of ZDA (greater than about 40 pph) provide desirable increases in initial velocity and COR to the base rubber.

Suitable free radical initiators are typically a peroxide, preferably an organic peroxide, and include without limitation dicumyl peroxide; n-butyl-4,4-di(t-butylperoxy)-valerate; 1,1-bis(t-butylperoxy)-3,3,5-trimethylcyclohexane; α,α'-bis(t-butylperoxy)-diisopropylbenzene; 2,5-dimethyl-2,5-di(t-butylperoxy)hexane; di-t-butyl peroxide; di-t-amyl peroxide; di(2-t-butyl-peroxyisopropyl)benzene peroxide; lauryl peroxide; benzoyl peroxide; t-butyl hydroperoxide; and mixtures thereof. Preferably, the peroxide initiator is dicumyl peroxide. The free radical initiator, at between about 70% and about 100% activity, is preferably added in an amount ranging between about 0.05 and about 15.0 pph by weight of the base rubber. More preferably, the amount of the initiator added ranges between about 0.1 and about 5.0 pph, and most preferably between about 0.25 and about 1.50 pph. The initiator may alternatively or additionally be one or more of electron beams; gamma radiation; infrared radiation; ultra-violet radiation; X-ray radiation; or any other high-energy radiation source capable of generating free radicals. Additives for the free radical initiators include free radical scavengers, scorch retarders, stable free radicals, sulfur-based curing agents with optional accelerators, and mixtures thereof.

The polybutadiene rubber may be mixed with a cis-to-trans catalyst and an optional accelerator during molding to increase resilience and/or decrease compression of the golf ball cores formed therefrom. Suitable materials for the cis-to-trans catalyst and accelerator are disclosed in U.S. Pat. Nos. 6,291,592 and 6,162,135, the disclosures of which are incorporated herein by reference in their entirety. Other core additives well known to the skilled artisan include fillers to adjust the density and/or specific gravity of the core, anti-oxidants to prevent the breakdown of the base rubber, processing aids, processing oils, plasticizers, dyes and pigments.

Halogenated thiophenol compounds may also be used in the present invention and include, but are not limited to, those having the following general formula:

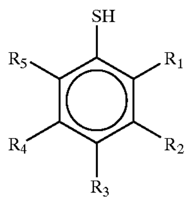

where at least one of $R_1$–$R_5$ is a halogen and where $R_1$–$R_5$ can be $C_1$–$C_8$ alkyl groups; halogen groups; thiol groups (—SH), carboxylated groups; sulfonated groups; and hydrogen; in any order; and also pentafluorothiophenol; 2-fluorothiophenol; 3-fluorothiophenol; 4-fluorothiophenol; 2,3-fluorothiophenol; 2,4-fluorothiophenol; 3,4-fluorothiophenol; 3,5-fluorothiophenol 2,3,4-fluorothiophenol; 3,4,5-fluorothiophenol; 2,3,4,5-tetrafluorothiophenol; 2,3,5,6-tetrafluorothiophenol; 4-chlorotetrafluorothiophenol; pentachlorothiophenol; 2-chlorothiophenol; 3-chlorothiophenol; 4-chlorothiophenol; 2,3-chlorothiophenol; 2,4-chlorothiophenol; 3,4-chlorothiophenol; 3,5-chlorothiophenol; 2,3,4-chlorothiophenol; 3,4,5-chlorothiophenol; 2,3,4,5-tetrachlorothiophenol; 2,3,5,6-tetrachlorothiophenol; pentabromothiophenol; 2-bromothiophenol; 3-bromothiophenol; 4-bromothiophenol; 2,3-bromothiophenol; 2,4-bromothiophenol; 3,4-bromothiophenol; 3,5-bromothiophenol; 2,3,4-bromothiophenol; 3,4,5-bromothiophenol; 2,3,4,5-tetrabromothiophenol; 2,3,5,6-tetrabromothiophenol; pentaiodothiophenol; 2-iodothiophenol; 3-iodothiophenol; 4-iodothiophenol; 2,3-iodothiophenol; 2,4-iodothiophenol; 3,4-iodothiophenol; 3,5-iodothiophenol; 2,3,4-iodothiophenol; 3,4,5-iodothiophenol; 2,3,4,5-tetraiodothiophenol; 2,3,5,6-tetraiodothiophenoland; and their zinc salts. Preferably, the halogenated thiophenol compound is pentachlorothiophenol, which is commercially available in neat form or under the tradename STRUKTOL®, a clay-based carrier containing the sulfur compound pentachlorothiophenol loaded at 45 percent (correlating to 2.4 parts PCTP). STRUKTOL® is commercially available from Struktol Company of America of Stow, Ohio. PCTP is commercially available in neat form from eChinachem of San Francisco, Calif. and in the salt form from eChinachem of San Francisco, Calif. Most preferably, the halogenated thiophenol compound is the zinc salt of pentachlorothiophenol, which is commercially available from eChinachem of San Francisco, Calif. The halogenated thiophenol compounds of the present invention are typically present in an amount from about 0.01 pph to about 5 pph, preferably about 2.2 pph or greater, more preferably between about 2.3 pph and about 5 pph, and most preferably between about 2.3 and about 4 pph.

U.S. application Ser. No. 10/230,015, now U.S. Publication No. 2003/0114565, and U.S. application Ser. No. 10/108,793, now U.S. Publication No. 2003/0050373, which are incorporated by reference herein in its entirety, discuss soft, high resilient ionomers, which are preferably from neutralizing the acid copolymer(s) of at least one E/X/Y copolymer, where E is ethylene, X is the α,β-ethylenically unsaturated carboxylic acid, and Y is a softening co-monomer. X is preferably present in 2–30 (preferably 4–20, most preferably 5–15) wt. % of the polymer, and Y is preferably present in 17–40 (preferably 20–40, and more preferably 24–35) wt. % of the polymer. Preferably, the melt index (MI) of the base resin is at least 20, or at least 40, more preferably, at least 75 and most preferably at least 150. Particular soft, resilient ionomers included in this invention are partially neutralized ethylene/(meth) acrylic acid/butyl (meth) acrylate copolymers having an MI and level of neutralization that results in a melt processible polymer that has useful physical properties. The copolymers are at least partially neutralized. Preferably at least 40, or, more preferably at least 55, even more preferably about 70, and most preferably about 80 of the acid moiety of the acid copolymer is neutralized by one or more alkali metal, transition metal, or alkaline earth metal cations. Cations useful in making the ionomers of this invention comprise lithium, sodium, potassium, magnesium, calcium, barium, or zinc, or a combination of such cations.

The invention also relates to a "modified" soft, resilient thermoplastic ionomer that comprises a melt blend of (a) the acid copolymers or the melt processiible ionomers made therefrom as described above and (b) one or more organic acid(s) or salt(s) thereof, wherein greater than 80%, preferably greater than 90% of all the acid of (a) and of (b) is neutralized. Preferably, 100% of all the acid of (a) and (b) is neutralized by a cation source. Preferably, an amount of cation source in excess of the amount required to neutralize 100% of the acid in (a) and (b) is used to neutralize the acid in (a) and (b). Blends with fatty acids or fatty acid salts are preferred.

The organic acids or salts thereof are added in an amount sufficient to enhance the resilience of the copolymer. Preferably, the organic acids or salts thereof are added in an amount sufficient to substantially remove remaining ethylene crystallinity of the copolymer.

Preferably, the organic acids or salts are added in an amount of at least about 5% (weight basis) of the total amount of copolymer and organic acid(s). More preferably, the organic acids or salts thereof are added in an amount of at least about 15%, even more preferably at least about 20%. Preferably, the organic acid(s) are added in an amount up to about 50% (weight basis) based on the total amount of copolymer and organic acid. More preferably, the organic acids or salts thereof are added in an amount of up to about 40%, more preferably, up to about 35%. The non-volatile, non-migratory organic acids preferably are one or more aliphatic, mono-functional organic acids or salts thereof as described below, particularly one or more aliphatic, mono-functional, saturated or unsaturated organic acids having less than 36 carbon atoms or salts of the organic acids, preferably stearic acid or oleic acid. Fatty acids or fatty acid salts are most preferred.

Processes for fatty acid (salt) modifications are known in the art. Particularly, the modified highly-neutralized soft, resilient acid copolymer ionomers of this invention can be produced by:

(a) melt-blending (1) ethylene, α,β-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory organic acids to substantially enhance the resilience and to disrupt (preferably remove) the remaining ethylene crystallinity, and then concurrently or subsequently (b) adding a sufficient amount of a cation source to increase the level of neutralization of all the acid moieties (including those in the acid copolymer and in the organic acid if the non-volatile, non-migratory organic acid is an organic acid) to the desired level.

The weight ratio of X to Y in the composition is at least about 1:20. Preferably, the weight ratio of X to Y is at least about 1:15, more preferably, at least about 1:10. Furthermore, the weight ratio of X to Y is up to about 1:1.67, more preferably up to about 1:2. Most preferably, the weight ratio of X to Y in the composition is up to about 1:2.2.

The acid copolymers used in the present invention to make the ionomers are preferably 'direct' acid copolymers (containing high levels of softening monomers). As noted above, the copolymers are at least partially neutralized, preferably at least about 40% of X in the composition is neutralized. More preferably, at least about 55% of X is neutralized. Even more preferably, at least about 70, and most preferably, at least about 80% of X is neutralized. In the event that the copolymer is highly neutralized (e.g., to at least 45%, preferably 50%, 55%, 70%, or 80%, of acid moiety), the MI of the acid copolymer should be sufficiently high so that the resulting neutralized resin has a measurable MI in accord with ASTM D-1238, condition E, at 190° C., using a 2160 gram weight. Preferably this resulting MI will be at least 0.1, preferably at least 0.5, and more preferably 1.0 or greater. Preferably, for highly neutralized acid copolymer, the MI of the acid copolymer base resin is at least 20, or at least 40, at least 75, and more preferably at least 150.

The acid copolymers preferably comprise alpha olefin, particularly ethylene, $C_{3-8}$. α,β-ethylenically unsaturated carboxylic acid, particularly acrylic and methacrylic acid, and softening monomers, selected from alkyl acrylate, and alkyl methacrylate, wherein the alkyl groups have from 1–8 carbon atoms, copolymers. By "softening," it is meant that the crystallinity is disrupted (the polymer is made less crystalline). While the alpha olefin can be a $C_2$–$C_4$ alpha olefin, ethylene is most preferred for use in the present invention. Accordingly, it is described and illustrated herein in terms of ethylene as the alpha olefin.

The acid copolymers, when the alpha olefin is ethylene, can be described as E/X/Y copolymers where E is ethylene, X is the α,β-ethylenically unsaturated carboxylic acid, and Y is a softening comonomer X is preferably present in 2–30 (preferably 4–20, most preferably 5–15) wt. % of the polymer, and Y is preferably present in 17–40 (preferably 20–40, most preferably 24–35) wt. % of the polymer.

The ethylene-acid copolymers with high levels of acid (X) are difficult to prepare in continuous polymerizers because of monomer-polymer phase separation. This difficulty can be avoided however by use of "co-solvent technology" as described in U.S. Pat. No. 5,028,674, or by employing somewhat higher pressures than those which copolymers with lower acid can be prepared.

Specific acid-copolymers include ethylene/(meth) acrylic acid/n-butyl (meth) acrylate, ethylene/(meth) acrylic acid/iso-butyl (meth) acrylate, ethylene/(meth) acrylic acid/methyl (meth) acrylate, and ethylene/(meth) acrylic acid/ethyl (meth) acrylate terpolymers.

The organic acids employed are aliphatic, mono-functional (saturated, unsaturated, or multi-unsaturated) organic acids, particularly those having fewer than 36 carbon atoms. Also salts of these organic acids may be employed. Fatty acids or fatty acid salts are preferred. The salts may be any of a wide variety, particularly including the barium, lithium, sodium, zinc, bismuth, potassium, strontium, magnesium or calcium salts of the organic acids. Particular organic acids useful in the present invention include caproic acid, caprylic acid, capric acid, lauric acid, stearic acid, behenic acid, erucic acid, oleic acid, and linoleic acid.

The optional filler component is chosen to impart additional density to blends of the previously described components, the selection being dependent upon the different parts (e.g., cover, mantle, core, center, intermediate layers in a multilayered core or ball) and the type of golf ball desired (e.g., one-piece, two-piece, three-piece or multiple-piece ball), as will be more fully detailed below.

Generally, the filler will be inorganic having a density greater than about 4 g/cm$^3$, preferably greater than 5 g/cm$^3$, and will be present in amounts between 0 to about 60 wt. % based on the total weight of the composition. Examples of useful fillers include zinc oxide, barium sulfate, lead silicate and tungsten carbide, as well as the other well-known fillers used in golf balls. It is preferred that the filler materials be non-reactive or almost non-reactive and not stiffen or raise the compression nor reduce the coefficient of restitution significantly.

Additional optional additives useful in the practice of the subject invention include acid copolymer wax (e.g., Allied wax AC 143 believed to be an ethylene/16–18% acrylic acid copolymer with a number average molecular weight of 2,040), which assist in preventing reaction between the filler materials (e.g., ZnO) and the acid moiety in the ethylene copolymer. Other optional additives include $TiO_2$, which is used as a whitening agent; optical brighteners; surfactants; processing aids; etc.

Ionomers may be blended with conventional ionomeric copolymers (di-, ter-, etc.), using well-known techniques, to manipulate product properties as desired. The blends would still exhibit lower hardness and higher resilience when compared with blends based on conventional ionomers.

Also, ionomers can be blended with non-ionic thermoplastic resins to manipulate product properties. The non-ionic thermoplastic resins would, by way of non-limiting illustrative examples, include thermoplastic elastomers, such as polyurethane, poly-ether-ester, poly-amide-ether, polyether-urea, PEBAX® (a family of block copolymers based on polyether-block-amide, commercially suppled by Atochem), styrene-butadiene-styrene (SBS) block copolymers, styrene(ethylene-butylene)-styrene block copolymers, etc., poly amide (oligomeric and polymeric), polyesters, polyolefins including PE, PP, E/P copolymers, etc., ethylene copolymers with various comonomers, such as vinyl acetate, (meth)acrylates, (meth)acrylic acid, epoxy-functionalized monomer, CO, etc., functionalized polymers with maleic anhydride grafting, epoxidization etc., elastomers, such as EPDM, metallocene catalyzed PE and copolymer, ground up powders of the thermoset elastomers, etc. Such thermoplastic blends comprise about 1% to about 99% by weight of a first thermoplastic and about 99% to about 1% by weight of a second thermoplastic.

Additionally, the compositions of U.S. application Ser. No. 10/269,341, now U.S. Publication No. 2003/0130434, and U.S. Pat. No. 6,653,382, both of which are incorporated herein in their entirety, discuss compositions having high COR when formed into solid spheres.

The thermoplastic composition of this invention comprises a polymer which, when formed into a sphere that is 1.50 to 1.54 inches in diameter, has a coefficient of restitution (COR) when measured by firing the sphere at an initial velocity of 125 feet/second against a steel plate positioned 3 feet from the point where initial velocity and rebound velocity are determined and by dividing the rebound velocity from the plate by the initial velocity and an Atti compression of no more than 100.

The thermoplastic composition of this invention preferably comprises (a) aliphatic, mono-functional organic acid(s) having fewer than 36 carbon atoms; and (b) ethylene, $C_3$ to $C_8$ α,β-ethylenically unsaturated carboxylic acid copolymer(s) and ionomer(s) thereof, wherein greater than 90%, preferably near 100%, and more preferably 100% of all the acid of (a) and (b) are neutralized.

The thermoplastic composition preferably comprises melt-processible, highly-neutralized (greater than 90%, preferably near 100%, and more preferably 100%) polymer of (1) ethylene, $C_3$ to $C_8$ α,β-ethylenically unsaturated carboxylic acid copolymers that have their crystallinity disrupted by addition of a softening monomer or other means such as high acid levels, and (2) non-volatile, non-migratory agents such as organic acids (or salts) selected for their ability to substantially or totally suppress any remaining ethylene crystallinity. Agents other than organic acids (or salts) may be used.

It has been found that, by modifying an acid copolymer or ionomer with a sufficient amount of specific organic acids (or salts thereof); it is possible to highly neutralize the acid copolymer without losing processibility or properties such as elongation and toughness. The organic acids employed in the present invention are aliphatic, mono-functional, saturated or unsaturated organic acids, particularly those having fewer than 36 carbon atoms, and particularly those that are non-volatile and non-migratory and exhibit ionic array plasticizing and ethylene crystallinity suppression properties.

With the addition of sufficient organic acid, greater than 90%, nearly 100%, and preferably 100% of the acid moieties in the acid copolymer from which the ionomer is made can be neutralized without losing the processibility and properties of elongation and toughness.

The melt-processible, highly-neutralized acid copolymer ionomer can be produced by the following:

(a) melt-blending (1) ethylene α,β-ethylenically unsaturated $C_{3-8}$ carboxylic acid copolymer(s) or melt-processible ionomer(s) thereof (ionomers that are not neutralized to the level that they have become intractable, that is not melt-processible) with (1) one or more aliphatic, mono-functional, saturated or unsaturated organic acids having fewer than 36 carbon atoms or salts of the organic acids, and then concurrently or subsequently (b) adding a sufficient amount of a cation source to increase the level of neutralization all the acid moieties (including those in the acid copolymer and in the organic acid) to greater than 90%, preferably near 100%, more preferably to 100%.

Preferably, highly-neutralized thermoplastics of the invention can be made by:

(a) melt-blending (1) ethylene, α,β-ethylenically unsaturated $C_{3-8}$ carboxylic acid copolymer(s) or melt-processible ionomer(s) thereof that have their crystallinity disrupted by addition of a softening monomer or other means with (2) sufficient non-volatile, non-migratory agents to substantially remove the remaining ethylene crystallinity, and then concurrently or subsequently (b) adding a sufficient amount of a cation source to increase the level of neutralization all the acid moieties (including those in the acid copolymer and in the organic acid if the non-volatile, non-migratory agent is an organic acid) to greater than 90%, preferably near 100%, more preferably to 100%.

The acid copolymers used in the present invention to make the ionomers are preferably 'direct' acid copolymers. They are preferably alpha olefin, particularly ethylene, $C_{3-8}$ α,β-ethylenically unsaturated carboxylic acid, particularly acrylic and methacrylic acid, copolymers. They may optionally contain a third softening monomer. By "softening," it is meant that the crystallinity is disrupted (the polymer is made less crystalline). Suitable "softening" comonomers are monomers selected from alkyl acrylate, and alkyl methacrylate, wherein the alkyl groups have from 1–8 carbon atoms.

The acid copolymers, when the alpha olefin is ethylene, can be described as E/X/Y copolymers where E is ethylene, X is the α,β-ethylenically unsaturated carboxylic acid, and Y is a softening comonomer. X is preferably present in 3–30 (preferably 4–25, most preferably 5–20) wt. % of the polymer, and Y is preferably present in 0–30 (alternatively 3–25 or 10–23) wt. % of the polymer.

Spheres were prepared using fully neutralized ionomers A and B and are described in Table II below.

TABLE II

| Sample | Resin Type (%) | Acid Type (%) | Cation (% neut*) | M.I. (g/10 min) |
|---|---|---|---|---|
| 1A | A(60) | Oleic (40) | Mg (100) | 1.0 |
| 2B | A(60) | Oleic (40) | Mg (105)* | 0.9 |
| 3C | B(60) | Oleic (40) | Mg (100) | 0.9 |
| 4D | B(60) | Oleic (40) | Mg (105)* | 0.9 |
| 5E | B(60) | Stearic (40) | Mg (100) | 0.85 |

A - ethylene, 14.8% normal butyl acrylate, 8.3% acrylic acid
B - ethylene, 14.9% normal butyl acrylate, 10.1% acrylic acid
*indicates that cation was sufficient to neutralize 105% of all the acid in the resin and the organic acid.

These compositions were molded into 1.53-inch spheres for which data is presented in the following table.

TABLE III

| Sample | Atti Compression | COR @ 125 ft/s |
|---|---|---|
| 1A | 75 | 0.826 |
| 2B | 75 | 0.826 |
| 3C | 78 | 0.837 |
| 4D | 76 | 0.837 |
| 5E | 97 | 0.807 |

Further testing of commercially available highly neutralized polymers HNP1 and HNP2 had the following properties.

TABLE IV

| Material Properties | | |
|---|---|---|
| | HNP1 | HNP2 |
| Specific Gravity | 0.966 | 0.974 |
| Melt Flow, 190° C., 10-kg load | 0.65 | 1.0 |
| Shore D Flex Bar (40 hr) | 47.0 | 46.0 |
| Shore D Flex Bar (2 week) | 51.0 | 48.0 |
| Flex Modulus, psi (40 hr) | 25,800 | 16,100 |
| Flex Modulus, psi (2 week) | 39,900 | 21,000 |
| DSC Melting Point (° C.) | 61.0 | 61/101 |
| Moisture (ppm) | 1500 | 4500 |
| Weight % Mg | 2.65 | 2.96 |

TABLE V

| Solid Sphere Data | | | | | |
|---|---|---|---|---|---|
| Material | HNP1 | HNP2 | HNP2a | HNP1a | HNP1a/HNP2a (50:50 blend) |
| Spec. Grav. | 0.954 | 0.959 | 1.153 | 1.146 | 1.148 |
| Filler | None | None | Tungsten | Tungsten | Tungsten |
| Compression | 107 | 83 | 86 | 62 | 72 |
| COR | 0.827 | 0.853 | 0.844 | 0.806 | 0.822 |

TABLE V-continued

| Solid Sphere Data | | | | | |
|---|---|---|---|---|---|
| Material | HNP1 | HNP2 | HNP2a | HNP1a | HNP1a/HNP2a (50:50 blend) |
| Shore D | 51 | 47 | 49 | 42 | 45 |
| Shore C | | | 79 | 72 | 75 |

In a preferred embodiment, the core is formed from a diene rubber composition, optionally comprising glass microspheres, having a density of about 1.05 or less, more preferably about 1.0 or less, most preferably about 0.95 or less. An intermediate layer is disposed between the core and any cover layer or layers. Preferably, the intermediate layer has a density of from about 1.3 to about 1.9 and comprises the non-ionic fluoropolymer and acrylate-based polymer compositions of the present invention. A ratio of the core density to the intermediate layer density should be about 0.85 and less, preferably about 0.8 and less, more preferably about 0.6 and less, and most preferably about 0.55 and less, and reflects the relatively high density of the NIFP layers and the therefore required relatively low density of the core. In a particularly preferred embodiment, the ratio of the core density to the intermediate layer density is between about 0.5 and about 0.81.

These materials are exemplary examples of the preferred center and/or core layer compositions of the present invention. They may also be used as a cover layer herein.

In a preferred embodiment, the present invention is directed to an improved multi-layer golf ball which comprises a core, a cover, and at least one intermediate layer disposed between the core and the cover. Preferably, the core has a compression ranging from about 10 to about 100. The core preferably has a diameter of about 1.00 inch to about 1.65 inches, more preferably about 1.25 inches to about 1.60 inches, and most preferably about 1.40 inches to about 1.58 inches. The cover is formed of one or more layers including inner and outer cover layers. It is preferred that a finished golf ball made with such a core has a COR of greater than about 0.75, more preferably about 0.78 to about 0.85 and most preferably about 0.79 to about 0.82.

Manufacturing of the golf balls of the present invention may utilize any conventional processes employed in the golf ball art. For example, the solid cores can be either injection or compression molded. The intermediate layer is subsequently cast, melt extruded, injection molded, compression molded, heat shrink-wrapped, or spin-coated about the core. It is important that the intermediate layer material be able to sustain the temperatures applied during the application of the cover layer. The cover layer or layers are then injection or compression molded or cast about the intermediate layer. The intermediate layers and the cover layers may also be molded around any solid core by a reaction product injection molding process as described in U.S. Pat. Nos. 6,392,002 and 6,371,870, which are incorporated herein, in their entirety, by express reference hereto.

The invention, with respect to golf ball compositions comprising impact-modified non-ionic fluoropolymers will now be described in more detail with respect to the following non-limiting examples.

EXAMPLES

Sample intermediate layers of the present invention were molded over polybutadiene cores having an outer diameter of 1.550 inches, an ATTI compression of 73, and a COR of 0.796. Composition of the cores is: 100 pph polybutadiene rubber (Bayer® CB-23), 25.5 pph zinc diacrylate (Sartomer® SR-526), 0.5 pph peroxide initiator, 5.3 pph zinc oxide, 10.5 pph density-modifying filler (tungsten), 2.0 pph processing aids, and 0.2 pph color pigment. The intermediate layers all had a thickness of 0.035 inches. Compositions of the intermediate layers and their respective performance properties are listed in Table VI below.

TABLE VI

Golf ball intermediate layers formed of non-ionomeric fluoropolymers

| | Control | Example 1 | Example 2 | Example 3 | Example 4 |
|---|---|---|---|---|---|
| Composition | | | | | |
| Surlyn ® 7940 | 50% | | | | |
| Surlyn ® 8940 | 50% | | | | |
| Kynar Flex ® 2900-04 | | 100% | | | |
| Kynar Flex ® 2850-04 | | | 100% | | |
| Kynar Flex ® 3120-10 | | | | 100% | 75% |
| Kynar Flex ® 2950-10 | | | | | 25% |
| Properties | | | | | |
| ATTI Compression | 79 | 80 | 93 | 89 | 83 |
| COR @ 125 ft/s | 0.804 | 0.795 | 0.806 | 0.777 | 0.796 |
| Water Absorption | >0.5% | <0.05% | <0.05% | <0.05% | <0.07% |

According to the data tabulated above, the intermediate layers formed from various non-ionomeric fluoropolymers, Kynar Flex® from Atofina Chemicals, Inc. in particular, significantly reduced the water absorption in the samples in comparison with the Surlyn® ionomer based intermediate layer in the controls. Specifically, the reduction in water absorption was at least one order of magnitude greater. This improvement is desirable in golf balls to prolong their shelf life and to enhance their durability. Other performance properties of the samples were comparable to the controls. In particular, while the ATTI compression of the samples was slightly increased, there was no significant loss in COR.

Two 1.550-inch cores were constructed from a blend of polybutadiene rubber, organosulfur compound, ZnO, Zn-diacrylate, peroxide, and density-adjusting fillers. Example #1, representative of the present invention, was constructed to a weight of 1.196 g by inclusion of glass microspheres, and had a COR of 0.828 and a Shore C hardness of 84. Example #2, a control core, was constructed to a weight of 1.297 g and had a COR of 0.809 and a Shore C hardness of 80. The differences in weight were necessitated by the much heavier inner casing materials of the present invention. The differences in core properties also result from the necessitated changes. Differences in core weight, hardness, and COR were remedied upon adding the inner casing layer of the present invention, which is much heavier than a standard ionomer casing layer. These changes can be seen below in Table VII.

TABLE VII

| | Example #1 | Example #2 |
|---|---|---|
| Properties | | |
| Inner casing material | vinylidene fluoride based polymer | 50/50 blend of Na/Li ionomer |
| Flexural modulus of casing material (psi) | 85,400 | 63,600 |
| Inner casing + core weight (g) | 1.449 | 1.441 |
| COR of core + casing (measured @ 125 ft/s) | 0.809 | 0.813 |
| Hardness of casing (Shore C) | 88 | 87 |
| Performance | | |
| Durability (1st failure) | no failure up to 400 hits | 8 failures in 281 hits |
| Std. driver spin rate (rpm) | 2943 | 3121 |
| 8-iron spin rate (rpm) | 8202 | 8026 |

Example #1 of the present invention showed no failures after 400 hits with a driver whereas Example #2 failed 8 times out of 281 hits. Driver spin of Example #1 was lower that that of #2—lower driver spin generally equates to increased distance. On the other hand, 8-iron spin increased for Example #1 compared with #2. Increased spin off the higher irons is important for touch around the green and the ability to make the ball stop where it lands. This improved durability, driver spin, and 8-iron spin was accomplished without any measurable loss of ball speed, as evidenced in Table VII above.

All patents and patent applications cited in the foregoing text are expressly incorporated herein by reference in their entirety.

Other than in the operating examples, or unless otherwise expressly specified, all of the numerical ranges, amounts, values and percentages, such as those for amounts of materials and others, in the following portion of the specification may be read as if prefaced by the word "about" even though the term "about" may not expressly appear with the value, amount or range. Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contain certain errors necessarily resulting from the standard deviation found in their respective testing measurements. Furthermore, when numerical ranges of varying scope are set forth herein, it is contemplated that any combination of these values inclusive of the recited values may be used.

While it is apparent that the illustrative embodiments of the invention disclosed herein fulfill the preferred embodiments of the present invention, it is appreciated that numerous modifications and other embodiments may be devised by those skilled in the art. Therefore, it will be understood that the appended claims are intended to cover all such modifications and embodiments, which would come within the spirit and scope of the present invention.

What is claimed is:

1. A golf ball comprising:

a core having a first density formed from a diene rubber composition comprising glass microspheres having an isotactic crush strength of about 5,000 psi or greater and having a true density of about 0.70 $g/cm^3$ or less, the microspheres being present in an amount sufficient to lower the first density to about 1.05 $g/cm^3$ or less;

a cover; and an intermediate layer disposed between the core and the cover, the intermediate layer having a density of from about 1.3 $g/cm^3$ to about 1.9 $g/cm^3$ and comprising a composition formed from a compatibilized blend of a non-ionic fluoropolymer and an acrylate-based polymer;

wherein a ratio of the core density to the intermediate layer density is between about 0.81 to about 0.5.

2. The golf ball of claim 1, wherein the acrylate-based polymer or non-ionic fluoropolymer comprise a homopolymer, a copolymer, or a terpolymer.

3. The golf ball of claim 1, wherein the acrylate-based polymer comprises:

a homopolymer having the structure:

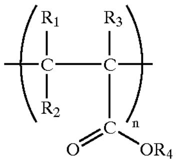

where x is a repeat unit from 100 to 100,000; $R_1$, $R_2$, and $R_3$ are H, aryl, or alkyl moieties having the formula $C_nH_{2n+1}$, where n=1 to 6; and $R_4$ is an alkyl moiety having the formula $C_nH_{2n+1}$;

a copolymer having the structure:

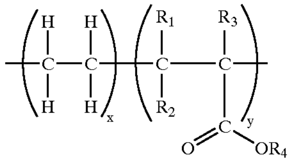

where x=99 to 1 weight %; y=1 to 99 weight %; and $R_1$, $R_2$, and $R_3$ are H, aryl, or alkyl moieties having the formula $C_nH_{2n+1}$, where n=1 to 6, and $R_4$ is an alkyl moiety having the formula $C_nH_{2n+1}$; or a terpolymer having the structure:

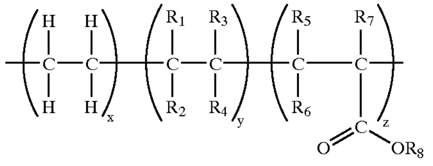

where x=98 to 1 weight %; y=1 to 98 weight %; z=1 to 10 weight %; and $R_1$, $R_2$, $R_3$, $R_4$, $R_5$, $R_6$, and $R_7$, are H, aryl, or alkyl moieties having the formula $C_nH_{2n+1}$, where n=1 to 6, and $R_8$ is an alkyl moiety having the formula $C_nH_{2n+1}$.

4. The golf ball of claim 1, wherein the non-ionic fluoropolymer has a formula:

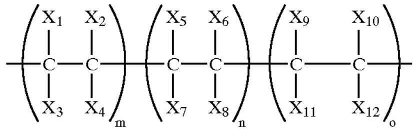

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the non-ionic fluoropolymer; n ranges from 0 to 50 percent by weight of the non-ionic fluoropolymer; and o ranges from 0 to 35 percent by weight of the non-ionic fluoropolymer.

5. The golf ball of claim 1, wherein the intermediate layer comprises an outer core layer, a casing layer, a mantle layer, or an inner cover layer.

6. The golf ball of claim 1, wherein the intermediate layer further comprises a thermoplastic material comprising polyesterester block copolymers, polyetherester block copolymers, polyetheramide block copolymers, partially or fully neutralized ionomer resins, dynamically vulcanized thermoplastic elastomers, hydrogenated styrene-butadiene elastomers with functional groups attached, thermoplastic polyurethanes, thermoplastic polyesters, metallocene polymers; styrene-propylene-diene rubbers; polybutadienes; chloroprene rubbers; acrylonitrile rubbers; acrylonitrile-butadiene rubbers; ethylene/propylene/diene terpolymers; polypropylene resins; epoxy; polyurea; styrene-ethylene block copolymers; maleic anhydride or succinate modified metallocene catalyzed ethylene copolymers; chlorinated polyethylenes; polysulfide rubbers; fluorocarbons; or polymethylmethacrylate.

7. The golf ball of claim 1, wherein the non-ionic fluoropolymer has a material hardness between about 25 Shore D and about 75 Shore D.

8. The golf ball of claim 7, wherein the non-ionic fluoropolymer has a material hardness of between about 50 Shore D and about 70 Shore D.

9. The golf ball of claim 1, wherein the intermediate or cover layer has a thickness between about 0.005 inches and about 0.085 inches.

10. The golf ball of claim 8, wherein the intermediate or cover layer has a thickness between about 0.030 inches and about 0.060 inches.

11. The golf ball of claim 1, wherein the core has an outer diameter between about 1.50 inches and about 1.65 inches.

12. The golf ball of claim 1, wherein the core comprises a center, the center being solid, hollow, liquid-filled, gel-filled, or gas-filled, and at least one outer core layer.

13. The golf ball of claim 1, wherein the cover comprises a castable or non-castable thermoplastic or thermosetting material comprising partially- or fully-neutralized ionomer resins; epoxy; polyurethanes comprising polyols and polyisocyanates; balata; vinyl resins; polyolefins; polyureas; polyamides; acrylic resins and blends thereof; block copolymers; copoly(ether-amide); polyphenylene oxide resins and blends thereof; thermoplastic polyesters; blends and alloys including polycarbonate with acrylonitrile butadiene styrene and polyvinyl chloride with acrylonitrile butadiene styrene; or blends of thermoplastic rubbers with polyethylene and propylene.

14. The golf ball of claim 1, wherein the core has a Shore D hardness of about 60 or less.

15. The golf ball of claim 1, wherein the core or cover comprises at least one additive comprising antioxidants; catalysts; colorants including pigments and dyes; hindered amine light stabilizers; optical brighteners; UV absorbers; fillers; metals; plasticizers; surfactants; viscosity modifiers; compatibility agents; dispersing agents; foaming agents; reinforcement agents; release agents; or a mixture thereof.

16. The golf ball of claim 1, wherein the core density is about 0.95 or less.

17. A golf ball comprising:

a core comprising a center and an outer core layer, at least one of the center or core layer comprising glass microspheres having a true density of about 0.7 g/cm$^3$ or less and a thermal conductivity of about 0.125 W·m$^{-1}$·K$^{-1}$ or greater when measured at 70° F., such that the core has a density of about 1.05 g/cm$^3$ or less;

an inner cover layer and an outer cover layer comprising a castable or non-castable thermoplastic or thermosetting material comprising partially- or fully-neutralized ionomer resins; epoxy; polyurethanes comprising polyols and polyisocyanates; balata; vinyl resins; polyolefins; polyureas; polyamides; acrylic resins and blends thereof; block copolymers; copoly(ether-amide); polyphenylene oxide resins and blends thereof; thermoplastic polyesters; blends and alloys including polycarbonate with acrylonitrile butadiene styrene and polyvinyl chloride with acrylonitrile butadiene styrene; or blends of thermoplastic rubbers with polyethylene and propylene; and an intermediate layer disposed between the core and the inner cover layer, the intermediate layer comprising a composition formed from a compatibilized blend of a non-ionic fluoropolymer and an acrylate-based polymer.

18. The golf ball of claim 17, wherein the intermediate layer has a density of from about 1.3 g/cm$^3$ to about 1.9 g/cm$^3$.

19. The golf ball of claim 17, wherein a ratio of the core density to the intermediate layer density is about 0.8 and less.

20. The golf ball of claim 17, wherein the acrylate-based polymer comprises:

a homopolymer having the structure:

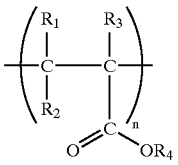

where x is a repeat unit from 100 to 100,000; $R_1$, $R_2$, and $R_3$ are H, aryl, or alkyl moieties having the formula $C_nH_{2n+1}$, where n=1 to 6; and $R_4$ is an alkyl moiety having the formula $C_nH_{2n+1}$;

a copolymer having the structure:

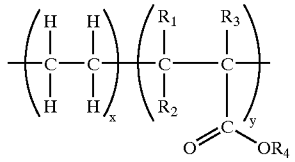

where x=99 to 1 weight %; y=1 to 99 weight %; and $R_1$, $R_2$, and $R_3$ are H, aryl, or alkyl moieties having the formula $C_nH_{2n+1}$, where n=1 to 6, and $R_4$ is an alkyl moiety having the formula $C_nH_{2n+1}$; or a terpolymer having the structure:

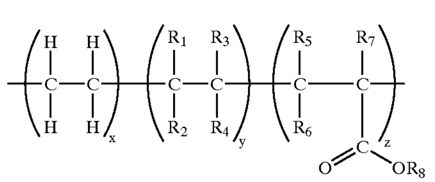

where x=98 to 1 weight %; y=1 to 98 weight %; z=1 to 10 weight %; and $R_1$, $R_2$, $R_3$, $R_4$, $R_5$, $R_6$, and $R_7$, are H, aryl, or alkyl moieties having the formula $C_nH_{2n+1}$, where n=1 to 6, and $R_8$ is an alkyl moiety having the formula $C_nH_{2n+1}$.

21. The golf ball of claim 17, wherein the golf ball has an outer diameter between about 1.50 inches and about 1.65 inches.

22. The golf ball of claim 17, wherein the intermediate or cover layer has a thickness between about 0.005 inches and about 0.085 inches.

23. The golf ball of claim 17, wherein the non-ionic fluoropolymer has a formula:

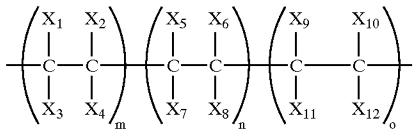

wherein $X_1$ to $X_{12}$ are hydrogen, fluorine, chlorine, bromine, iodine, $CH_3$, $CF_3$, linear or branched alkyl group, partially fluorinated or perfluorinated alkyl group, linear or branched alkoxy group, partially fluorinated or perfluorinated alkoxy group, aromatic, or alicyclic; at least one of $X_1$ to $X_4$ comprises a fluorine; m ranges from 100 to 1 percent by weight of the non-ionic fluoropolymer; n ranges from 0 to 50 percent by weight of the non-ionic fluoropolymer; and o ranges from 0 to 35 percent by weight of the non-ionic fluoropolymer.

24. The golf ball of claim 17, wherein at least one of the center or outer core layer comprises glass microspheres in an amount sufficient to decrease the core density to 0.95 or less.

25. The golf ball of claim 17, wherein at least one of the center or outer core layer is formed from a diene rubber composition, or partially- or fully-neutralized ionomers.

* * * * *